United States Patent
Takahashi et al.

(10) Patent No.: US 7,821,744 B2
(45) Date of Patent: Oct. 26, 2010

(54) THIN FILM MAGNETIC HEAD SUBSTRATE WITH LAPPING PROCESS MONITORS FOR READ AND WRITE ELEMENTS WITH COMMON ELECTRODE FOR THE READ AND WRITE ELEMENTS

(75) Inventors: Toru Takahashi, Niigata-ken (JP); Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 869 days.

(21) Appl. No.: 11/697,979

(22) Filed: Apr. 9, 2007

(65) Prior Publication Data

US 2007/0247753 A1      Oct. 25, 2007

(30) Foreign Application Priority Data

Apr. 10, 2006   (JP) .............................. 2006-107397

(51) Int. Cl.
*G11B 5/29*       (2006.01)
*H04F 31/00*     (2006.01)
(52) U.S. Cl. ................... 360/316; 360/121; 29/603.1
(58) Field of Classification Search ............. 360/121, 360/316; 29/603.1
See application file for complete search history.

(56) References Cited

U.S. PATENT DOCUMENTS 5,816,890 A * 10/1998 Hao et al. ................... 451/5
6,884,148 B1   4/2005 Dovek et al.

FOREIGN PATENT DOCUMENTS

JP       2005-317069        11/2005

OTHER PUBLICATIONS

Office Action issued in corresponding Japanese Patent Application No. 2006-107397; issued May 27, 2008.

* cited by examiner

*Primary Examiner*—A. J. Heinz
(74) *Attorney, Agent, or Firm*—Brinks Hofer Gilson & Lione (57) ABSTRACT

A thin film magnetic head substrate includes a plurality of head element portions having read elements and write elements in rows. Adjacent head element portions interpose a read monitor element and a write monitor element that are used as element resistance monitors for the read element and the write element when a lapping process is performed to form a medium-facing surface on the head element portion. A common electrode terminal is connected with the read monitor element and the write monitor element. A pair of individual electrode terminals are each connected to the read monitor element and the write monitor element, respectively.

10 Claims, 8 Drawing Sheets

THIN FILM MAGNETIC HEAD SUBSTRATE WITH LAPPING PROCESS MONITORS FOR READ AND WRITE ELEMENTS WITH COMMON ELECTRODE FOR THE READ AND WRITE ELEMENTS

CLAIM OF PRIORITY

This application claims benefit of the Japanese Patent Application No. 2006-107397 filed on Apr. 10, 2006, which is hereby incorporated by reference.

BACKGROUND

1. Field of the Invention

The present invention relates to a thin film magnetic head substrate, and more particularly, to a thin film magnetic head substrate including a monitor element used for the lapping process to form a medium-facing surface on a head element portion.

2. Description of the Related Art

A thin film magnetic head is produced by arranging head element portions (head element structures), each formed of at least a stack of a read element and a write element on a single wafer (substrate), in a plurality of rows. The wafer is then cut and lapped to form the medium-facing surface (to define the element height); thus providing a bar-like thin film magnetic head substrate having a plurality of the head element portions arranged in a single row on the wafer or an individual (chip-like) thin film magnetic head having one head element portion formed on the wafer.

The lapping process for forming the medium-facing surface is performed to lap the wafer end surface in the element height direction while applying the electric current to the read element or the read monitor element simultaneously produced to detect the element resistance. The lapping process ends when the element resistance reaches the specified value. In the case where the element height is specified based on the resistance value of the read element or the read monitor element, it is difficult to obtain an actual dimension of the height of the write element. The element height of the write element is required to be accurately specified as it is an important factor to contribute to the write property. The art described below has been proposed to form the read monitor elements and the write monitor elements each changing the resistance value in accordance with the element height of the read element and the write element simultaneously. The lapping is performed up to the position where the properties required for the respective elements are obtained while detecting each element resistance against the current applied to the respective read and write monitor elements.

The thin film magnetic head with monitor elements used for the aforementioned lapping process control has been disclosed in U.S. Pat. No. 6,884,148 as Patent Document 1.

In the aforementioned art where the monitor elements are provided individually for the read element and the write element, a wider space is required to accommodate not only the increased monitor elements but also the electrode terminals for those elements. Widening of the space for accommodating the monitor elements is undesirable because the number of the head element portions that may be formed on the single wafer is reduced, thus deteriorating the productivity. There is a need for arranging monitor elements individually provided for read and write elements to save space.

BRIEF SUMMARY

According to a first aspect, a thin film magnetic head substrate is provided. A plurality of head element portions including a read element and a write element are disposed on a thin film magnetic head substrate in rows. Adjacent head element portions interpose a read monitor element and a write monitor element. The read monitor and the write monitor elements are operable as element resistance monitors for the read element and the write element, respectively, when a lapping process is performed to form a medium-facing surface on the head element portion. A common electrode terminal is connected with the read monitor element and the write monitor element. A pair of individual electrode terminals are each connected with the read monitor element and the write monitor element, respectively.

According to a second aspect, the common electrode terminal and the pair of individual electrode terminals are independently provided between the adjacent head element portions.

According to a third aspect, each of the adjacent head element portions includes at least a pair of read electrode pads connected with the read element, and a pair of write electrode pads connected with the write element. The common electrode terminal is independently disposed between the adjacent head element portions. The pair of individual electrode terminals comprises a combination of two of the plurality of electrode pads each selected from the adjacent head element portions. The combination of the two electrode pads is protected from short-circuit.

According to a fourth aspect, the pair of individual electrode terminals comprises the read electrode pad provided on one of the adjacent head element portions and the write electrode pad provided on another of the adjacent head element portions.

According to a fifth aspect, the pair of individual electrode terminals comprises the write electrode pad provided on one of the adjacent head element portions and the write electrode pad provided on another of the adjacent head element portions.

According to a sixth aspect, each of the adjacent head element portions includes a heater element that generates heat to protrude the read element toward the medium-facing surface, a first heater electrode pad connected with the heater element, and a second heater electrode pad operable to connect the heater element to a ground potential. The pair of individual electrode terminals comprises a read electrode pad provided on one of the adjacent head element portions and the first heater electrode pad provided on another of the adjacent head element portions.

According to a seventh aspect, the pair of individual electrode terminals comprises the second heater electrode pad or the first heater electrode pad provided on one of the adjacent head element portions and the write electrode pad provided on another of the adjacent head element portions.

According to an eighth aspect, the read monitor element is disposed on the same plane as the read element at a position different from that of the read element. The write monitor element is stacked above the read monitor element so as to be disposed on the same plane as the write element at a position different from that of the write element.

Other systems, methods, features, and advantages of the invention will be, or will become, apparent to one with skill in the art upon examination of the following figures and detailed description. It is intended that all such additional systems, methods, features, and advantages be included within this description.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

DESCRIPTION OF THE PREFERRED EMBODIMENT

A thin film magnetic head substrate with monitor elements for the lapping process to form the medium-facing surface on the head element portion is provided. Different embodiments of the thin film magnetic head substrate enhance productivity while saving space for accommodating the monitor elements. Also, the different embodiments allow for specifying each height dimension of read and write elements with high accuracy based on the change in each resistance of the respective monitor elements.

Figure 1:
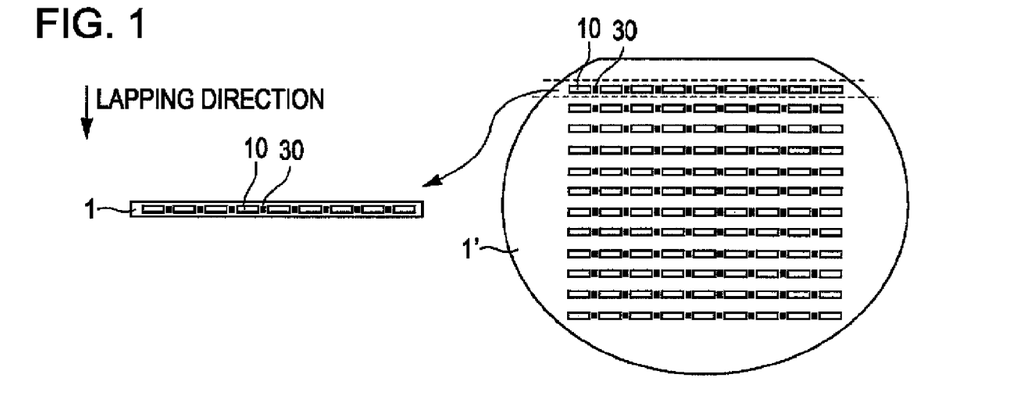
FIG. 1 is a plan view representing a thin film magnetic head substrate according to an exemplary embodiment.

FIG. 1 is a plan view showing a thin film magnetic head substrate according to an exemplary embodiment. A thin film magnetic head substrate 1 is obtained by arranging a plurality of head element portions 10 and monitor element portions 30 in rows on a single wafer 1' and cutting a thin long bar-like piece from the wafer (prior to the lapping process to form the medium-facing surface). Each of the head element portions 10 and the monitor element portions 30 will be represented by a blank rectangular mark and a filled square mark, respectively, in FIG. 1.

Figure 2:
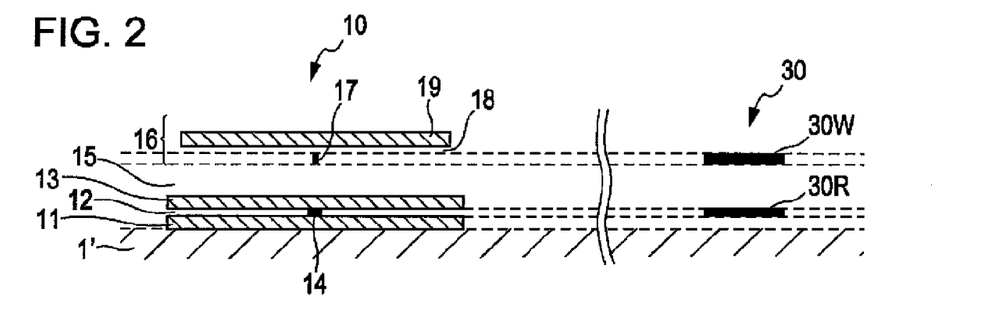
FIG. 2 is a sectional view showing a stack structure of the head element portion (perpendicular magnetic recording method) and the monitor element portion when viewed from the end of the medium-facing surface.
Figure 3:
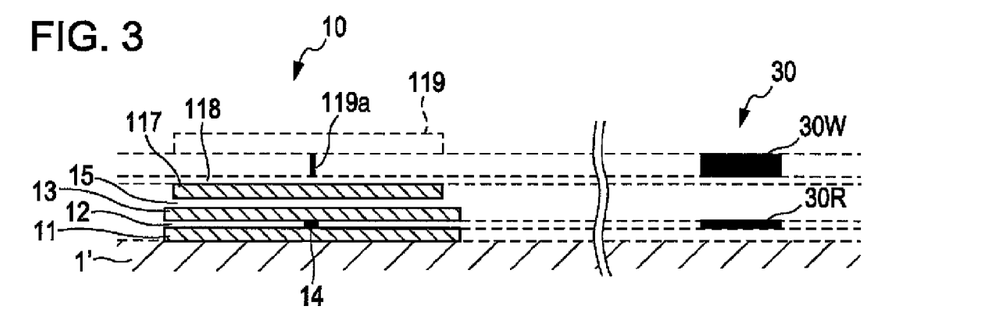
FIG. 3 is a sectional view showing a stack structure of the head element portion (longitudinal recording method) and the monitor element portion when viewed from the end of the medium-facing surface.

FIGS. 2 and 3 are sectional views of each stack structure of the head element portion 10 and the monitor element portion 30 viewed from the end of the medium-facing surface. The head element portion 10 includes a read element 14 that reads the magnetic recorded information of the recording medium using the magnetic resistance effect, a write element 16 that applies the recording magnetic field to the recording medium for performing the recording operation, a heater (not shown) that generates heat to protrude the head element portion 10 (especially the read element) toward the recording medium, and an electrode pad group 20 (see FIG. 4) for applying the electric current to the read element 14, the write element 16 and the heater.

The read element 14 may act as a magnetic resistance effect element. For example, AMR, GMR and TMR is formed within a gap insulating layer 12 that fills the gap between a lower shield layer 11 and an upper shield layer 13.

The write element 16 stacked above the upper shield layer 13 via an insulating layer 15 includes a main magnetic pole layer 17 and a return path layer 19 opposite to each other at the end, where the medium-facing surface is at a predetermined interval. A magnetic gap layer 18 may exist at the end as the medium-facing surface between the main magnetic pole layer 17 and the return path layer 19. A recording coil (not shown) may be between the main magnetic pole layer 17 and the return path layer 19 to apply the recording magnetic field to the main magnetic pole layer 17. The write element 16 may be of a vertical magnetic recording type to vertically apply the recording magnetic field to the recording medium. However, as shown in FIG. 3, the write element may be of longitudinal recording type including a lower core 117 and an upper core 119 opposite with each other at the end, where the medium-facing surface is at a predetermined interval. An upper magnetic pole layer 119a and a magnetic gap layer 118 may fill the gap between the lower core 117 and the upper core 119. A recording coil (not shown) that applies the recording magnetic field may be between the lower core 117 and the upper core 119.

Figure 4:
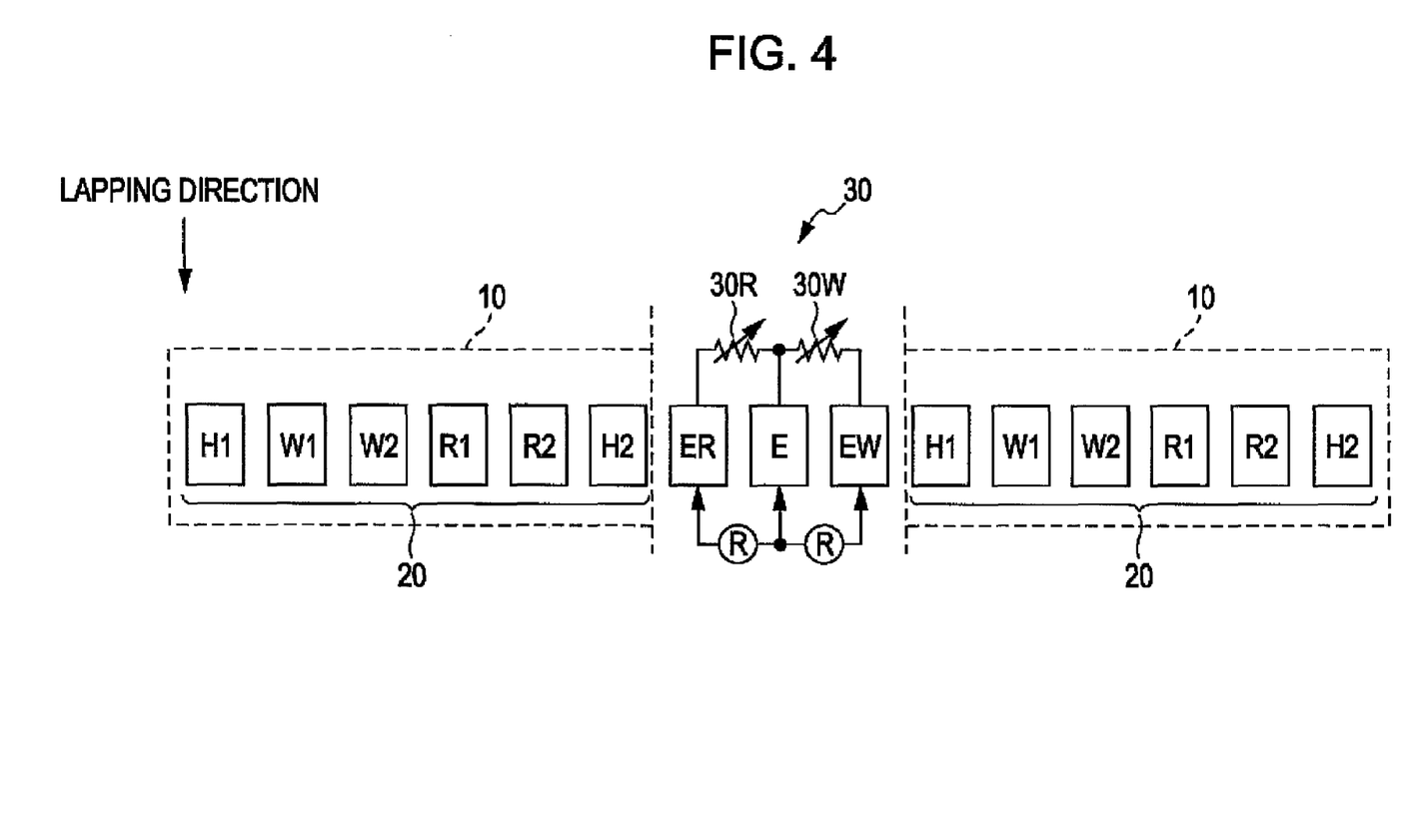
FIG. 4 is a conceptual view showing an arrangement pattern of the electrode pad groups of the head element portions and the electrode terminals of the monitor element portion according to a first embodiment.

FIG. 4 is a view showing an arrangement pattern of the electrode pads of the head element portion 10 and the electrode terminals of the monitor element portion 30 according to a first embodiment. The electrode pad group 20 includes a pair of read electrode pads (a first read electrode pad R1 and a second read electrode pad R2) connected to the read element 14, a pair of write electrode pads (a first write electrode pad W1 and a second write electrode pad W2) connected to the write element 16, and a pair of heater electrode pads (a first heater electrode pad H1 and a second heater electrode pad H2) connected to the heater. The second heater electrode pad H2 is connected to the wafer 1' at the ground potential. Referring to FIG. 4, in the embodiment, the first heater electrode pad H1, the first write electrode pad W1, the second write electrode pad W2, the first read electrode pad R1, the second read electrode pad R2, and the second heater electrode pad H2 are arranged from the left in the aforementioned order. The arrangement of the electrode pads may be arbitrarily set.

The monitor element portion 30, such as the element resistance monitor used for the lapping process to form the medium-facing surface, is formed between the head element portions 10. Referring to FIGS. 2 to 4, the monitor element portion 30 includes a read monitor element 30R that is formed simultaneously with the read element 14 (on the same layer as the read element 14 but at a position different therefrom) and a write monitor element 30W formed simultaneously with the main magnetic pole layer 17 of the write element 16 so as to be provided above the read monitor element 30R (on the same layer as the main magnetic pole layer 17 but at a position different therefrom). This makes it possible to make one electrode terminal for the read monitor element 30R and one electrode terminal for the write monitor element 30W to be commonly used. In the case where the read element 14 is a magnetic resistance effect element of CIP type, the film structure of the read monitor element 30R is the same as that of the read element 14. In the case where the read element 14 is a magnetic resistance effect element of CPP type, the read monitor element 30R is formed of the magnetic resistance effect element of CIP type, including the multi-layer film having the element resistance greater than that of the read element 14 and the same film structure as the read element 14, and a pair of electrode layers for applying the sense current in parallel with the film surface of the multi-layer film. The write monitor element 30W has the same film structure as that of the main magnetic pole layer 17. If the monitor elements are individually provided for the read element and the write element, respectively, each dimension of the element height of the read element 14 and the write element 16 in the lapping process may be individually detected based on each change in the resistance of the read monitor element 30R and the write monitor element 30W. When the respective element resistance values of the read monitor element 30R and the write monitor element 30W reach specified values, the lapping process ends to set the dimension of the element height of the read element 14 and the write element 16 with high accuracy, respectively.

Referring to FIG. 4, the monitor element portion 30 includes a common electrode terminal E connected to the read monitor element 30R and the write monitor element 30W, and a pair of individually provided electrode terminals ER and EW connected to the read monitor element 30R and the write monitor element 30W, respectively. The three electrode terminals E, ER and EW are provided between the head element portions 10. The pair of individual electrode terminals ER and EW interpose the common electrode terminal E. The electric current is applied to the read monitor element 30R through the common electrode terminal E and the individual electrode terminal ER, and the electric current is applied to the write monitor element 30W through the common electrode terminal E and the individual electrode terminal EW. As one of the electrode terminals of the read monitor element 30R and one of the electrode terminals of the write monitor element 30W are formed as a common electrode terminal E, the number of the electrode terminals may be decreased to reduce the space for accommodating the monitor element portion 30 compared with the case where each of the read monitor element 30R and the write monitor element 30W has two electrode terminals. This makes it possible to maintain the number of the head element portions 10 allowed to be formed on the thin film magnetic head substrate 1 even if two monitor elements, that is, read monitor element 30R and the write monitor element 30W, are provided.

Figure 5:
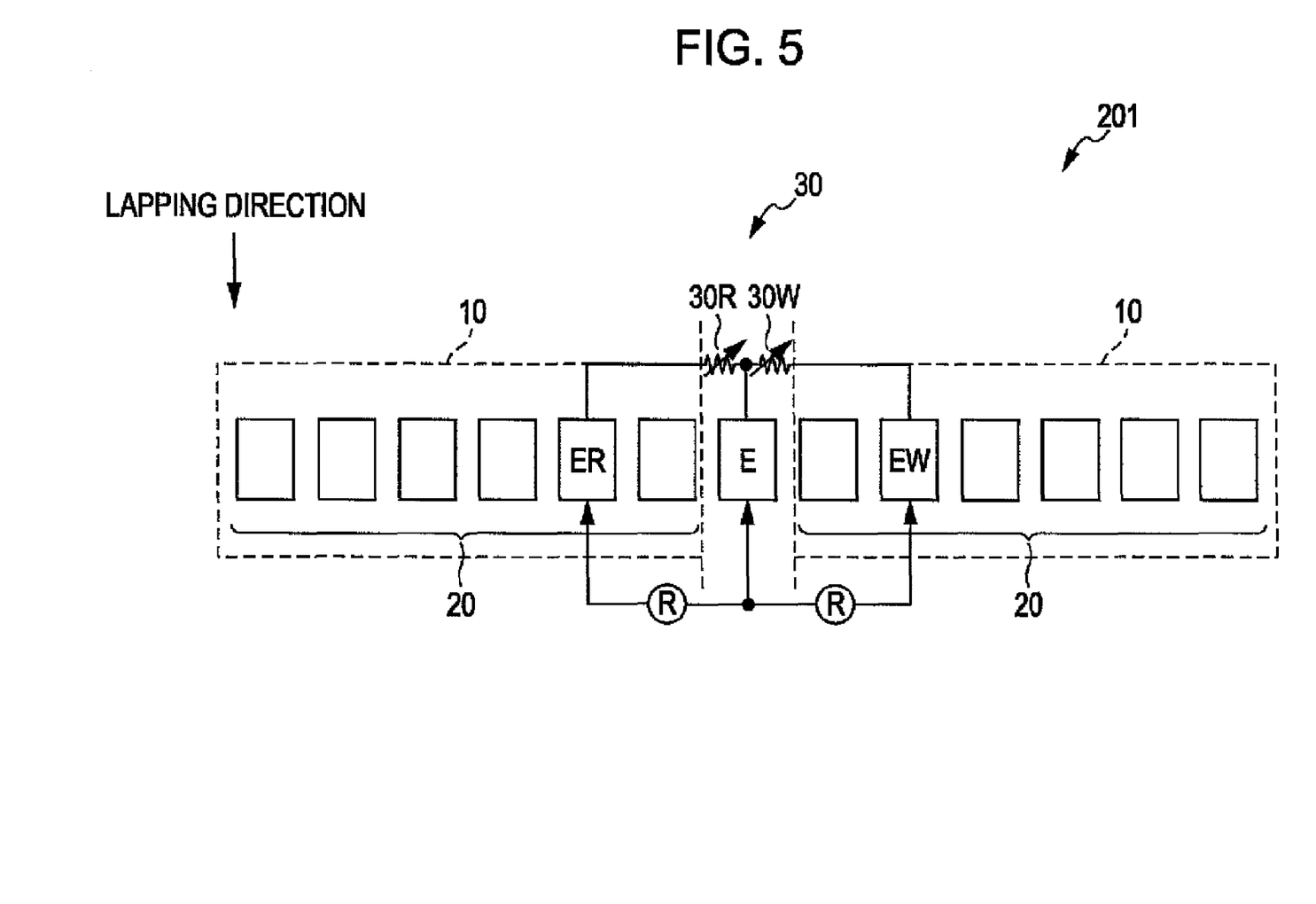
FIG. 5 is a conceptual view showing an arrangement pattern of the electrode pad groups of the head element portions and the electrode terminals of the monitor element portion according to a second embodiment.

FIG. 5 is a conceptual view showing the wiring pattern (arrangement pattern) of the electrode pad groups 20 of the head element portions 10 and the electrode terminals of the monitor element portion according to a second embodiment. A thin film magnetic head substrate 201 according to the second embodiment has the structure of the electrode terminal of the monitor element that is different from that of the first embodiment. Specifically, the common electrode terminal E connected to the read monitor element 30R and the write monitor element 30W is provided independently in the monitor element portion 30 (between the adjacent head element portions 10). The pair of individual electrode terminals ER and EW each connected to the read monitor element 30R and the write monitor element 30W are formed as a combination of two arbitrary pads each selected from the respective electrode pad groups 20 of the adjacent head element portions 10. The adjacent head element portions 10 interpose the monitor element portion 30. The combination of the two electrode pads is protected from short-circuit. As the pair of individual electrode terminals ER, EW may be made commonly used as the combination of arbitrary two pads of the electrode pad groups 20, the number of the electrode terminals is decreased to be smaller than the first embodiment. That is, only one electrode terminal (only common electrode terminal E) may be disposed in the monitor element portion 30, thus further reducing the space for accommodating the monitor element. The structure of the monitor element is substantially the same as that of the first embodiment except the electrode terminal of the monitor element. In the second embodiment shown in FIG. 5, the same components as those of the first embodiment are designated with the same reference numerals as shown in FIGS. 1 to 4.

Referring to the wiring patterns shown in FIGS. 6 to 10, the preferred combination of the electrode pads for use as the pair of individual electrode terminals ER and EW will be described in reference to examples. In each of FIGS. 6 to 10, the left monitor element is shown as the read monitor element 30R, and the right monitor element is shown as the write monitor element 30W, respectively, for easy understanding. However, the positions of the read monitor element 30R and the write monitor element 30W may be inverted.

Figure 6:
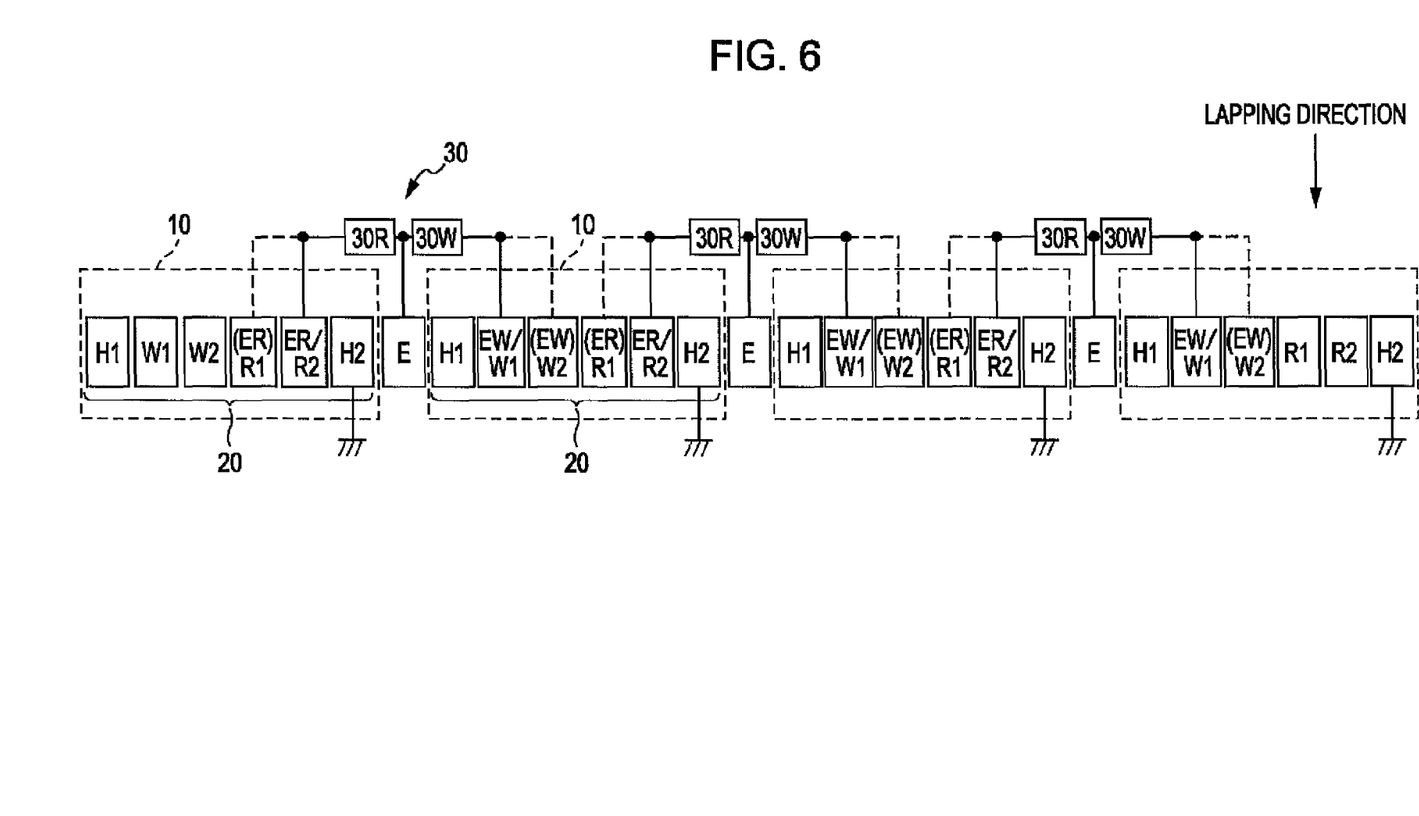
FIG. 6 is a view of a wiring pattern as a first example where the electrode pads are combined for use as the pair of individual electrode terminals shown in FIG. 5.

In a first example shown in FIG. 6 where the adjacent head element portions 10 interpose the monitor element portion 30, the read electrode pad R1 (or R2) of one of the head element portions 10 (to the left of the monitor element portion 30) and the write electrode pad W1 (or W2) of another of the head element portions 10 (to the right of the monitor element portion 30) are used as the pair of individual electrode terminals ER and EW, respectively. Specifically, the read monitor element 30R is connected to the common electrode terminal E and the read electrode pad R1 (or R2) of one of the adjacent head element portions 10. The write monitor element 30W is connected to the common electrode terminal E and the write electrode pad W1 (or W2) of the other of the adjacent head element portions 10. The combination of the read electrode pad R1 (or R2) and the write electrode pad W1 (or W2) is protected from short-circuit even if they are connected by conduction via the common electrode terminal E. This allows for application of electric current to the read monitor element 30R and the write monitor element 30W. The first example is applicable to the thin film magnetic head substrate of a type with no heater and the pair of heater electrode pads H1 and H2. It is also applicable to the case where the shunt resistance for preventing the electrostatic breakdown is connected to the read electrode pads R1 and R2.

Figure 7:
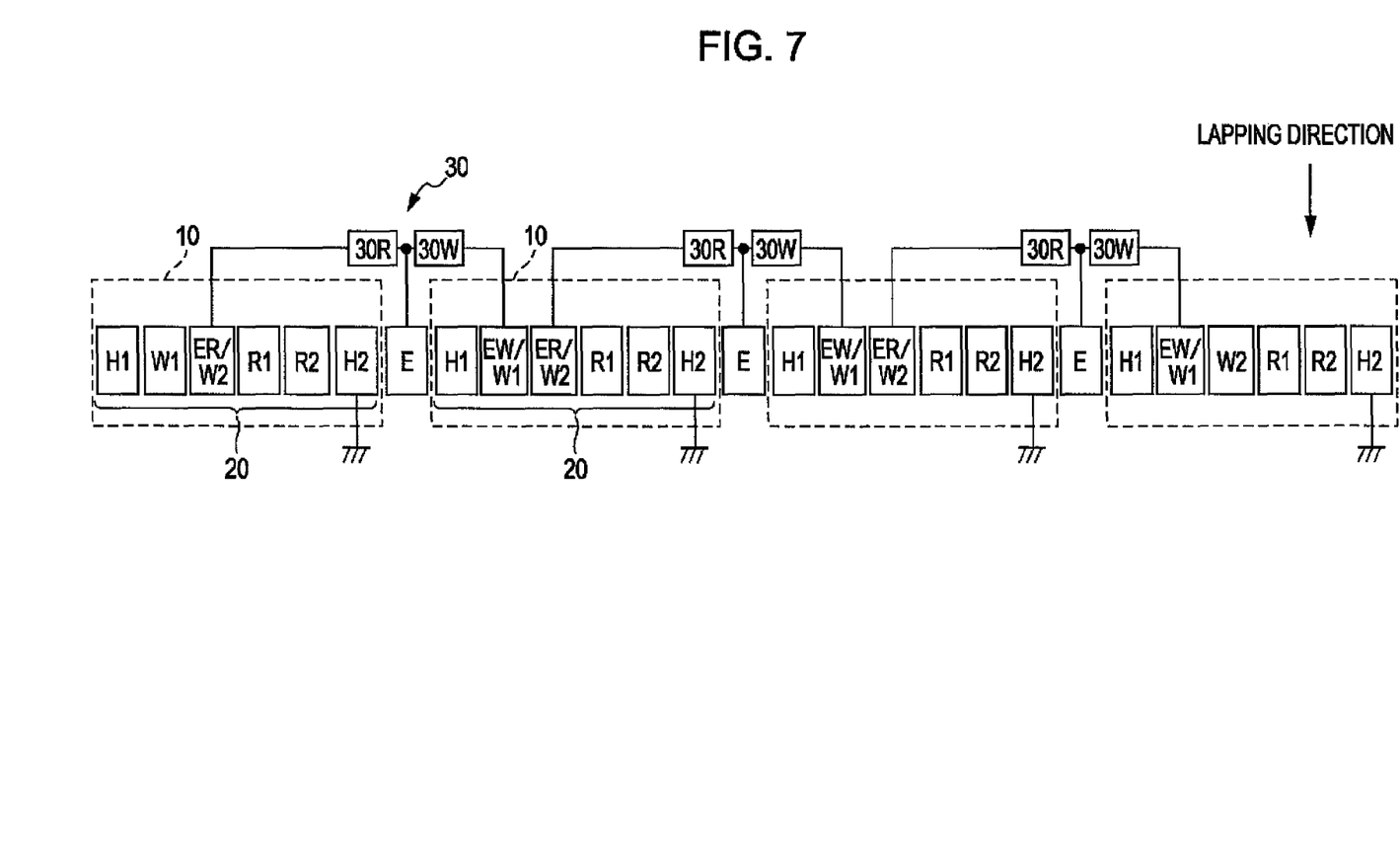
FIG. 7 is a view of a wiring pattern as a second example where the electrode pads are combined for use as the pair of individual electrode terminals shown in FIG. 5.

In a second example shown in FIG. 7 where the adjacent head element portions 10 interpose the monitor element portion 30, the write electrode pad W2 (or W1) of one of the head element portions 10 (to the left of the monitor element portion 30) and a write electrode pad W1 (or W2) of the other of the head element portions 10 (to the right of the monitor element portion 30) are used as the pair of individual electrode terminals ER and EW, respectively. Specifically, the read monitor element 30R is connected to the common electrode terminal E and the write electrode pad W2 of one of the head element portions 10. The write monitor element 30W is connected to the common electrode terminal E and the write electrode pad W1 of another of the head element portions 10. The combination of the write electrode pads W1 and W2 is protected from short-circuit even if they are connected by conduction via the common electrode terminal E. This allows for application of electric current to the read monitor element 30R and the write monitor element 30W. The second example is applicable to the thin film magnetic head substrate with no heater and the pair of heater electrode pads H1 and H2. It is also applicable to the case where the shunt resistance for preventing the electrostatic breakdown is connected to the read electrode pads R1 and R2.

Figure 8:
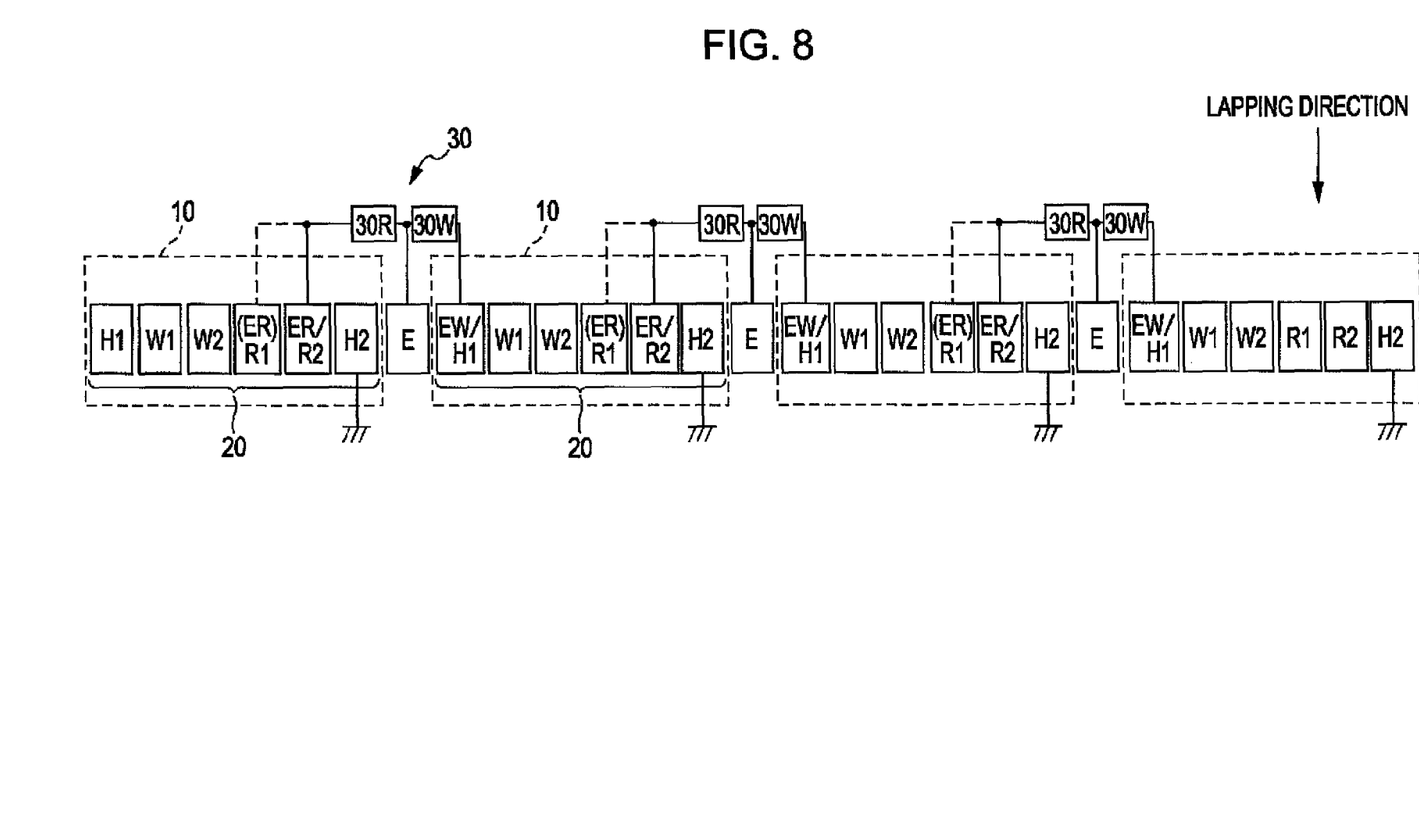
FIG. 8 is a view of a wiring pattern as a third example where the electrode pads are combined for use as the pair of individual electrode terminals shown in FIG. 5.

In a third example shown in FIG. 8 where the adjacent head element portions 10 interpose the monitor element portion 30, the read electrode pad R1 (or R2) of one of the head element portions 10 (to the left of the monitor element portion 30) and a first heater electrode pad H1 of the other of the head element portions 10 (to the right of the monitor element portion 30) are used as the pair of individual electrode terminals ER and EW, respectively. Specifically, the read monitor element 30R is connected to the common electrode terminal E and the read electrode pad R1 (or R2) of one of the head element portions 10. The write monitor element 30W is connected to the common electrode terminal E and the first heater electrode pad H1 of another of the head element portions 10. The combination of the read electrode pad R1 (or R2) and the heater electrode pad H1 is protected from short-circuit even if they are connected by conduction via the common electrode terminal E. This allows for application of electric current to the read monitor element 30R and the write monitor element 30W. The third example may not be applicable to the case where the shunt resistance for preventing the electrostatic breakdown is connected to the read electrode pads R1 and R2 due to a potential short-circuit via the grounded second heater electrode pad H2.

Figure 9:
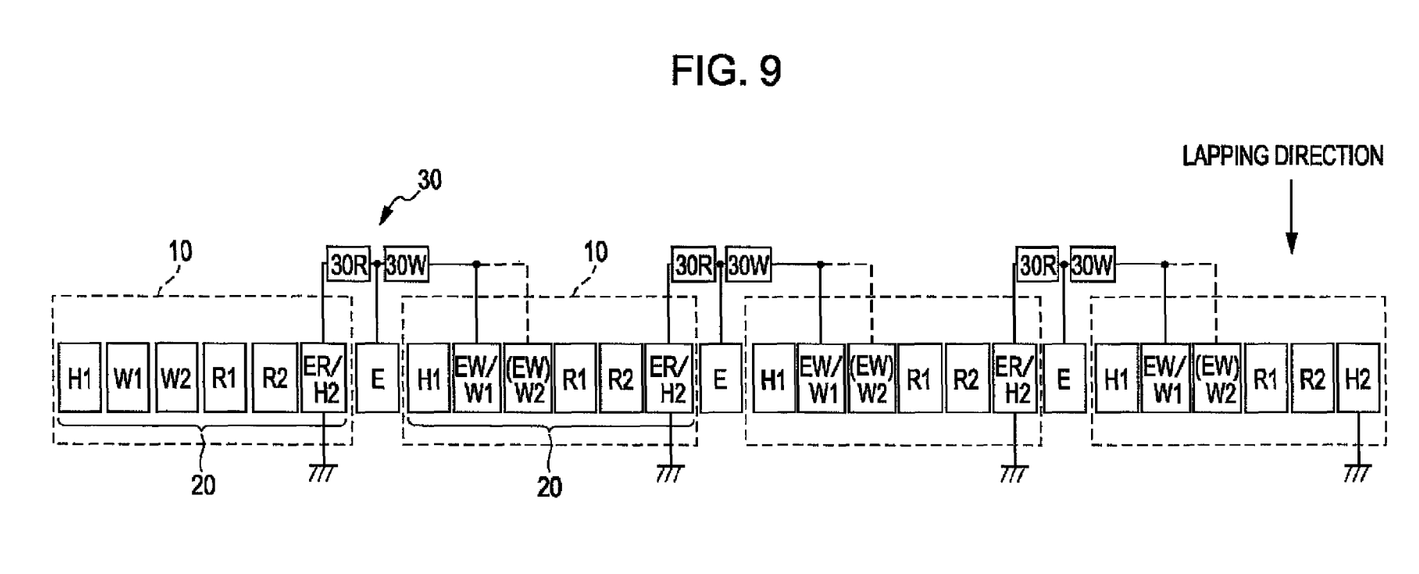
FIG. 9 is a view of a wiring pattern as a fourth example where the electrode pads are combined for use as the pair of individual electrode terminals shown in FIG. 5.

In a fourth embodiment shown in FIG. 9 where the adjacent head element portions 10 interpose the monitor element portion 30, the second heater electrode pad H2 of one of the head element portions 10 (to the left of the monitor element portion 30) and a write electrode pad W1 (or W2) of another of the head element portions 10 (to the right of the monitor element portion 30) are used as the pair of individual electrode terminals ER and EW, respectively. Specifically, the read monitor element 30R is connected to the common electrode terminal E and the second heater electrode pad H2 of one of the head element portions 10. The write monitor element 30W is connected to the common electrode terminal E and the write electrode pad W1 (or W2) of the other of the head element portions 10. The combination of the second heater electrode pad H2 and the write electrode pad W1 (or W2) is protected from short-circuit even if they are connected by conduction via the common electrode terminal E. This allows for application of electric current to the read monitor element 30R and the write monitor element 30W. The fourth example is applicable to the case where the shunt resistance for preventing the electrostatic breakdown is connected to the read electrode pads R1 and R2.

Figure 10:
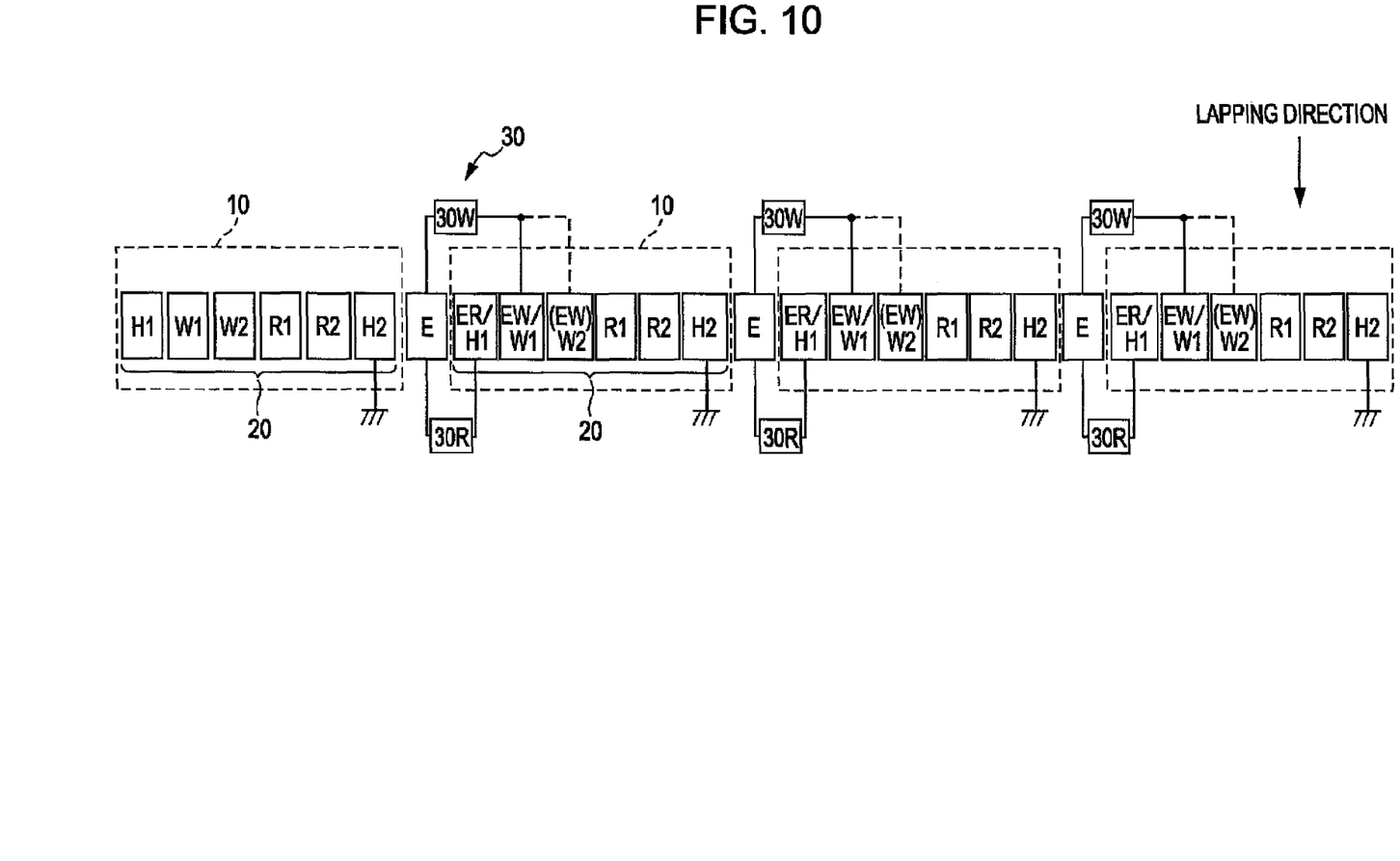
FIG. 10 is a view of a wiring pattern as a fifth example where the electrode pads are combined for use as the pair of individual electrode terminals shown in FIG. 5.

In the fifth example shown in FIG. 10 where the adjacent head element portions 10 interpose the monitor element portion 30, the first heater electrode pad H1 of one of the head element portions 10 (to the left of the monitor element portion 30) and a write electrode pad W1 (or W2) of another of the head element portions 10 are used as the pair of individual electrode terminals ER and EW, respectively. Specifically, the read monitor element 30R is connected to the common electrode terminal E and the first heater electrode pad H1 of one of the head element portions 10. The write monitor element 30W is connected to the common electrode terminal E and the write electrode pad W1 (or W2) of the other of the head element portions 10. The combination of the first heater electrode pad H1 and the write electrode pad W1 (or W2) is protected from short-circuit even if they are connected by conduction via the common electrode terminal E. This allows for application of electric current to the read monitor element 30R and the write monitor element 30W. The fifth example is applicable to the case where the shunt resistance for preventing the electrostatic breakdown is connected to the read electrode pads R1 and R2.

With the thin film magnetic head substrate 201 according to the aforementioned examples, the lapping process is performed from the direction indicated by the arrow of the drawing, as shown in FIGS. 1 and 4-10, while detecting each element resistance of the read monitor element 30R and the write monitor element 30W on the respective monitor element portions 30. The lapping process ends when each element resistance of the read monitor element 30R and the write monitor element 30W reaches the specified value, representing the preferred surface position as the medium-facing surface has been lapped, thus forming the medium-facing surface. The processed thin film magnetic head substrate 201 is cut by the respective head element portions 10 to provide chip-like thin film magnetic heads. The monitor element portion 30 may be removed when the substrate is cut into the respective thin film magnetic heads so as not to be mounted on the thin film magnetic head as the product. Also, the patterns that connect the two arbitrary pads of the electrode pad groups 20 of the head element portions 10 with the read monitor element 30R and the write monitor element 30W may be left on the respective thin film magnetic heads.

In each of the examples, the common electrode terminal E formed as one of the electrode terminals of the read monitor element 30R and one of the electrode terminals of the write monitor element 30W is provided to decrease the number of the electrode terminals for the monitor element portion 30, thus reducing the space for accommodating the monitor element. In the second embodiment, two arbitrary pads of the electrode pad groups 20 of the head element portions 10 may be combined as the pair of individual electrode terminals ER and EW respectively connected to the read monitor element 30R and the write monitor element 30W. The number of the electrode terminals for the monitor element portion 30 may be decreased, thus further reducing the space for accommodating the monitor element. The use of the read monitor element 30R and the write monitor element 30W makes it possible to specify the respective element height dimensions of the read element 14 and the write element 16 and to maintain the number of the head element portions 10, which may be formed on the thin film magnetic head substrate 1, thus improving the productivity.

Each electrode terminal of the read monitor element and the write monitor element is made to be commonly used. The electrode terminal for the read and the write monitor elements and the electrode pad for the head element portion are made to be commonly used. This makes it possible to reduce the space for accommodating the monitor elements by decreasing the number of the electrode terminals provided for the monitor elements.

The use of the thin film magnetic head substrate with the monitor elements used for the lapping process to form the medium-facing surface on the head element portion allows for enhancement of the productivity by reducing the space for accommodating the monitor elements and accurate setting of the respective element height dimensions of the read element and the write element based on the change in each resistance of the monitor elements.

It is intended that the foregoing detailed description be regarded as illustrative rather than limiting, and that it be understood that the following claims, including all equivalents, are intended to define the scope of this invention.

What is claimed is:

1. A thin film magnetic head substrate comprising:
a plurality of head element portions including a read element and a write element disposed on a thin film magnetic head substrate in rows, wherein adjacent head element portions interpose a read monitor element and a write monitor element, and wherein the read monitor and write monitor elements are operable as element resistance monitors for the read element and the write element, respectively, when a lapping process is performed to form a medium-facing surface on one head element portion;
a common electrode terminal connected with the read monitor element and the write monitor element; and
a pair of individual electrode terminals each connected with the read monitor element and the write monitor element, respectively.

2. The thin film magnetic head substrate according to claim 1, wherein the common electrode terminal and the pair of individual electrode terminals are independently provided between the adjacent head element portions.

3. The thin film magnetic head substrate according to claim 1, wherein each of the adjacent head element portions includes at least a pair of read electrode pads connected with the read element, and a pair of write electrode pads connected with the write element, and wherein the common electrode terminal is independently disposed between the adjacent head element portions, and the pair of individual electrode terminals comprises a combination of two of the plurality of electrode pads each selected from the adjacent head element portions, the combination of the two electrode pads is protected from short-circuit.

4. The thin film magnetic head substrate according to claim 3, wherein the pair of individual electrode terminals comprises the read electrode pad provided on one of the adjacent head element portions and the write electrode pad provided on another of the adjacent head element portions.

5. The thin film magnetic head substrate according to claim 3, wherein the pair of individual electrode terminals comprises the write electrode pad provided on one of the adjacent head element portions and the write electrode pad provided on another of the adjacent head element portions.

6. The thin film magnetic head substrate according to claim 3, wherein each of the adjacent head element portions includes a heater element that generates heat to protrude the read element toward the medium-facing surface, a first heater electrode pad connected with the heater element, and a second heater electrode pad operable to connect the heater element with a ground potential, and wherein the pair of individual electrode terminals is formed of a read electrode pad provided on one of the adjacent head element portions and the first heater electrode pad provided on another of the adjacent head element portions.

7. The thin film magnetic head substrate according to claim 3, wherein each of the adjacent head element portions includes a heater element that generates heat to protrude the read element toward the medium-facing surface, a first heater electrode pad connected with the heater element, and a second heater electrode pad operable to connect the heater element with a ground potential, and wherein the pair of individual electrode terminals comprises the second heater electrode pad provided on one of the adjacent head element portions and the write electrode pad provided on another of the adjacent head element portions.

8. The thin film magnetic head substrate according to claim 3, wherein each of the adjacent head element portions includes a heater element that generates heat to protrude the read element toward the medium-facing surface, a first heater electrode pad connected with the heater element, and a second heater electrode pad operable to connect the heater element with a ground potential, and wherein the pair of individual electrode terminals comprises the first heater electrode pad provided on one of the adjacent head element portions and the write electrode pad provided on another of the adjacent head element portions.

9. The thin film magnetic head substrate according to claim 3, wherein the read monitor element is disposed on the same plane as the read element at a position different from that of the read element, and wherein the write monitor element is stacked above the read monitor element so as to be disposed on the same plane as the write element at a position different from that of the write element.

10. The thin film magnetic head substrate according to claim 1, wherein the read monitor element is disposed on the same plane as the read element at a position different from that of the read element, and wherein the write monitor element is stacked above the read monitor element so as to be disposed on the same plane as the write element at a position different from that of the write element.

* * * * *